United States Patent
Westerinen et al.

(10) Patent No.: US 7,971,056 B2
(45) Date of Patent: Jun. 28, 2011

(54) DIRECT MEMORY ACCESS FOR COMPLIANCE CHECKING

(75) Inventors: William J. Westerinen, Sammamish, WA (US); Todd L. Carpenter, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 1224 days.

(21) Appl. No.: 11/612,433

(22) Filed: Dec. 18, 2006

(65) Prior Publication Data

US 2008/0148065 A1    Jun. 19, 2008

(51) Int. Cl.
  *H04L 29/00* (2006.01)
(52) U.S. Cl. ......... 713/164; 713/165; 713/166; 713/167
(58) Field of Classification Search .................... 713/164
See application file for complete search history.

(56) References Cited

U.S. PATENT DOCUMENTS

| | | | |
|---|---|---|---|
| 5,414,833 A * | 5/1995 | Hershey et al. ............. | 726/22 |
| 5,473,692 A | 12/1995 | Davis | |
| 5,793,943 A * | 8/1998 | Noll ............................ | 714/6 |
| 6,327,652 B1 | 12/2001 | England et al. | |
| 6,330,670 B1 * | 12/2001 | England et al. ............. | 713/2 |
| 6,651,188 B2 * | 11/2003 | Harding et al. ............. | 714/38 |
| 7,036,006 B2 | 4/2006 | Bandhole et al. | |
| 7,082,615 B1 | 7/2006 | Ellison et al. | |
| 2003/0196110 A1 | 10/2003 | Lampson et al. | |
| 2004/0090646 A1 * | 5/2004 | Saitoh et al. ................ | 358/1.14 |
| 2004/0210751 A1 * | 10/2004 | Wang ............................ | 713/1 |
| 2006/0015944 A1 * | 1/2006 | Fields .......................... | 726/27 |
| 2006/0106920 A1 | 5/2006 | Steeb et al. | |
| 2006/0107329 A1 | 5/2006 | Frank et al. | |
| 2006/0143446 A1 | 6/2006 | Frank et al. | |

OTHER PUBLICATIONS

"HP Pay per use-Active Core," Hewlett-Packard Development Company, L.P., 2006, http://h71028.www7.hp.com/ERC/downloads/5981-6253ENW.pdf.

Reid et al., "DRM, Trusted Computing and Operating System Architecture," Australian Computer Society, Inc., 2005, http://delivery.acm.org/10.1145/1090000/1082308/p127-reid.pdf?key1=1082308&key2=6826038511&coll=GUIDE&dl=GUIDE&CFID=1005980&CFTOKEN=75248142.

Arbaugh et al., "A Secure and Reliable Bootstrap Architecture," IEEE, 1997, http://ieeexplore.ieee.org/iel3/4693/13107/00601317.pdf?isNumber=.

* cited by examiner

Primary Examiner — Nasser Moazzami
Assistant Examiner — Ghazal Shehni (57) ABSTRACT

A computer is configured for either full operation with metering or limited mode operation. When in limited mode operation, the system memory may be partitioned into active and restricted memory. The active memory may be limited to an amount needed to execute a limited mode operation application. The remaining restricted memory may be made inaccessible to the computer's processor. To verify the restricted memory remains unused, it may be filled with a pattern and the pattern periodically verified to determine that unauthorized programs are not using the restricted memory.

19 Claims, 6 Drawing Sheets

DIRECT MEMORY ACCESS FOR COMPLIANCE CHECKING

BACKGROUND

When a business model allows selling a product at little or no cost and recouping the product's cost by selling services, such as with cellular phones, a key element is the ability to render the product useless if the terms of the service contract are not fulfilled. For example, if a cellular phone service subscriber fails to pay the agreed-to monthly fee, the service provider can simply turn off the phone's access to the network. Because the value of the phone is extremely limited if it cannot make phone calls, the service provider's investment is protected. Further, because the cellular phone may have little or no street value, there is little incentive to defraud the service provider for the sole purpose of getting an inexpensive cellular phone.

However, a subsidized computer may have considerable use and value when not connected to a network. Therefore, a business model that supplies computers or other high intrinsic value electronic devices to consumers at a reduced initial cost along with a services contract, e.g. Internet service access, must have a way of limiting access to the computer when the terms of contract are not fulfilled.

SUMMARY

A computer or electronic device adapted for metered use uses a security module to provide storage for the system BIOS. The security module may also contain a processor, secure storage, and cryptographic functions. The security module may communicate with the computer processor through a first communication port and may communicate to a direct memory access (DMA) controller through a second communication port, allowing the security module to access memory without processor intervention. When the security module determines that the computer is operating outside the requirements of the service agreement, for example, prepaid minutes have expired and related warnings ignored, the security module may reboot the computer. During the subsequent boot process, the security module may supply a restricted BIOS used for a limited operating mode. During the boot process, a limited amount of memory may be allocated to running a "locked mode" application program which supports only the ability to add more value to stored value registers in the security module, e.g. prepaid minutes. The remaining system memory may be designated as reserved, that is, inaccessible to the computer's main processor. Because only the memory used by the restricted mode application is accessible to the processor, attempts to run other applications, such as word processors or spreadsheet applications will fail for lack of available system memory.

To enforce the restrictions on memory, the security module may use its access to the DMA controller to write a pattern into the restricted memory and later read back the pattern to ensure that the memory is not in use by other, unauthorized programs. Because a substantial amount of memory may be involved, a cryptographic algorithm may be used to generate the pattern or verify the original contents. The cryptographic algorithm allows use a fast block cipher, such as the Advanced Encryption Standard (AES) algorithm, to generate patterns by address, or patterns from a known seed. Because the security module has a relatively modest set of resources, retaining a complete image of system memory may be impractical. A comparison process may then regenerate the pattern and compare on a selected bitwise basis, may hash a range of expected values, or use a similar process, to verify the pattern. An algorithmic approach may have an advantage in speed and security module resources over a brute force method. At any time when the comparison between actual and expected results fails, the security module may simple cause the computer to reboot. If a determined hacker does find a way to use the restricted memory for an unauthorized purpose, the ability to identify memory misappropriation and cause the system to reboot will at least interrupt the hacker's efforts.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
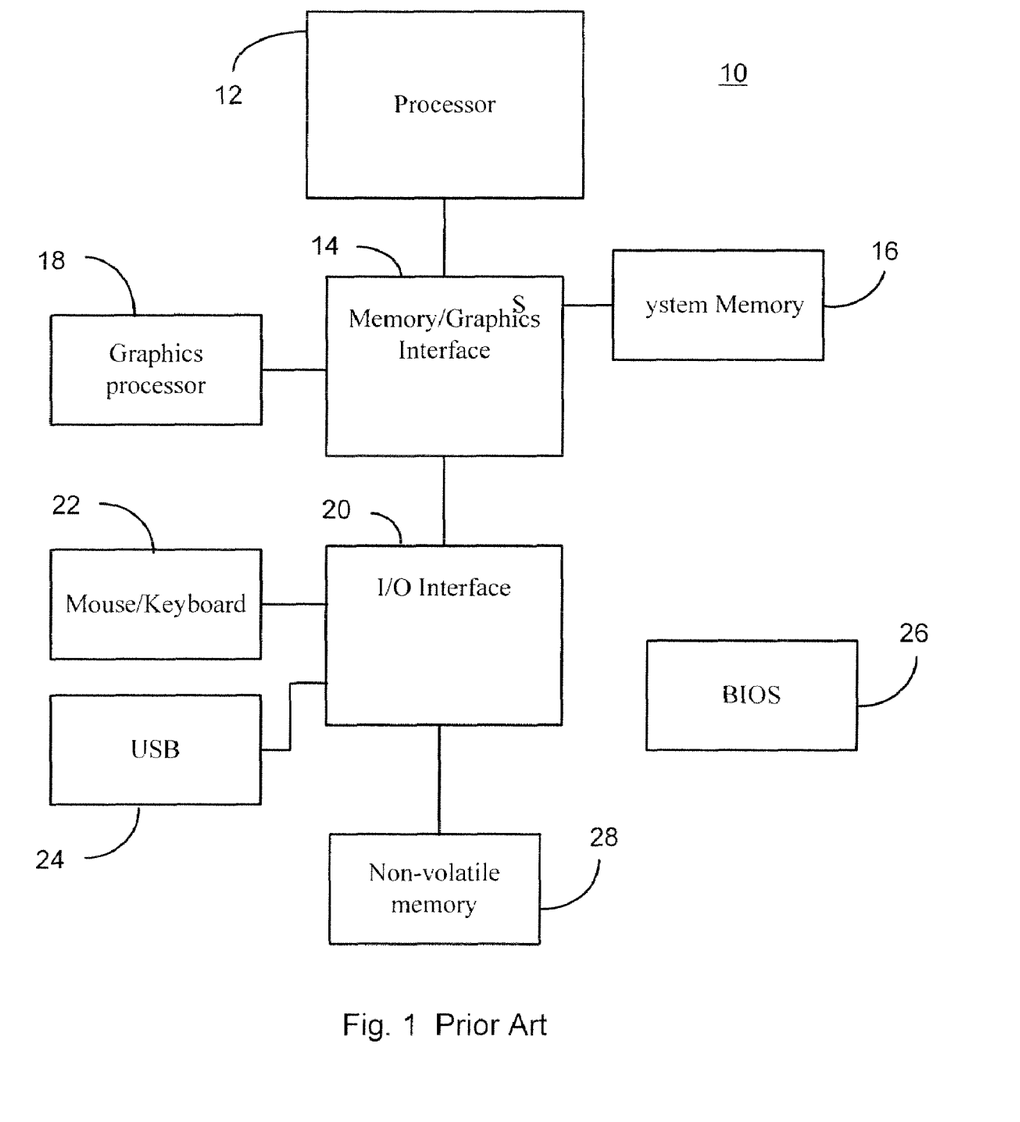
FIG. 1 is a simplified and representative block diagram of a prior art computer.

FIG. 1 is an architectural diagram of a prior art computer 10. The architecture of the computer 10 maybe typical of general-purpose computers widely sold and in current use. A processor 12 may be coupled to a graphics and memory interface 14. The graphics and memory interface 14 may be a "Northbridge" controller or its functional replacement in newer architectures, such as a "Graphics and AGP Memory Controller Hub" (GMCH). The graphics and memory interface 14 may be coupled to the processor 12 via a high speed data bus, such as the "Front Side Bus" (FSB), known in computer architectures. The processor 12 may also be connected, either directly or through the graphics and memory interface 14, to an input/output interface 20 (I/O interface). The I/O interface 20 may be coupled to a variety of devices represented by, but not limited to, the components discussed below. The I/O interface 20 may be a "Southbridge" chip or a functionally similar circuit, such as an "I/O Controller Hub" (ICH). Several vendors produce current-art Northbridge and Southbridge circuits and their functional equivalents, including Intel Corporation.

A variety of functional circuits may be coupled to either the graphics and memory interface 14 or the I/O Interface 20. The graphics and memory interface 14 may be coupled to system memory 16 and a graphics processor 18, which may itself be connected to a display (not depicted). A mouse/keyboard 22 may be coupled to the I/O interface 20. A universal serial bus (USB) 24 may be used to interface external peripherals including flash memory, cameras, network adapters, etc. (not depicted). Firmware, such as a basic input output system (BIOS) 26 may be accessed via the I/O interface 20. Nonvolatile memory 28, such as a hard disk drive or any of a number of other non-volatile memories, may also be coupled to the I/O interface 20.

Figure 2:
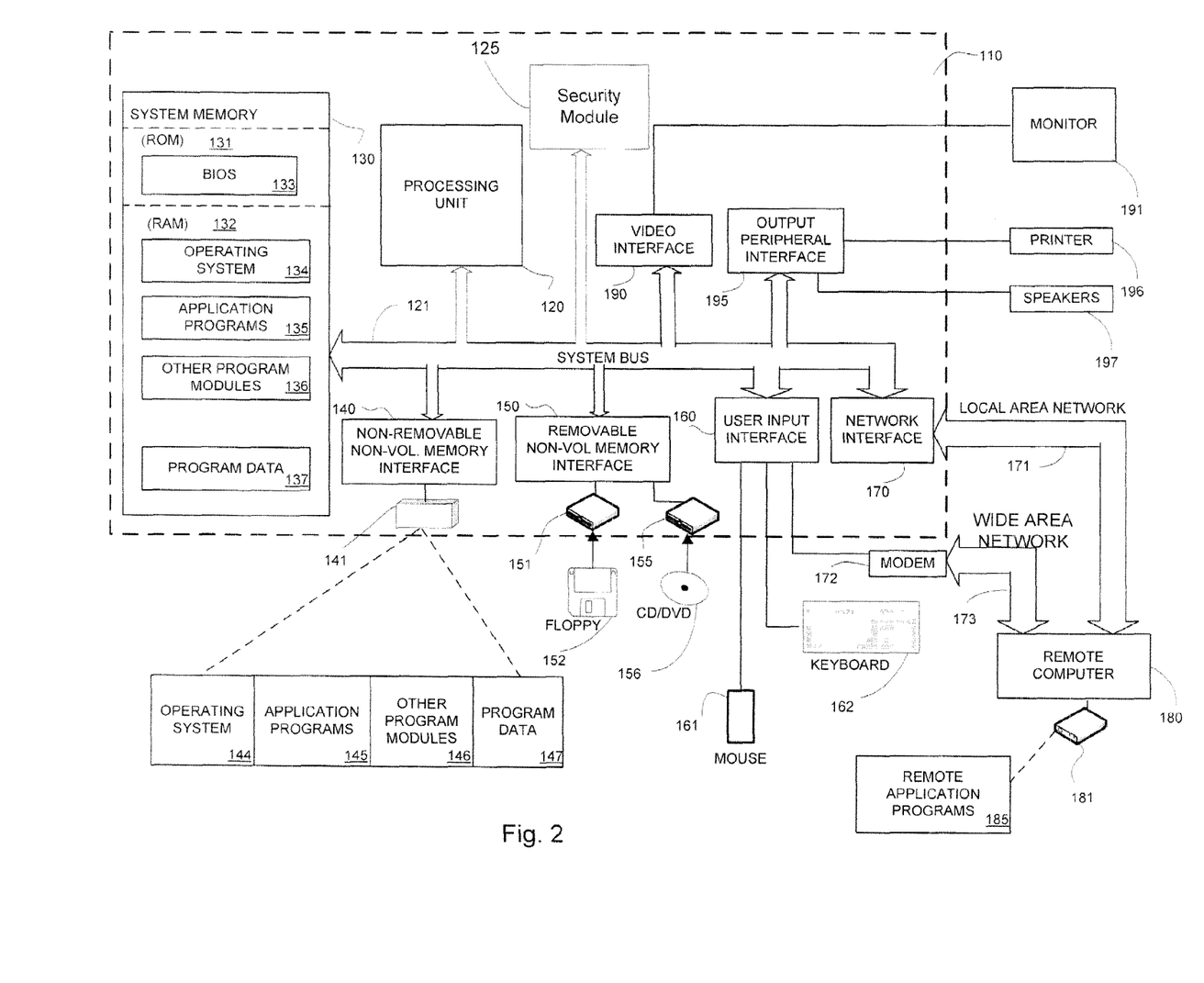
FIG. 2 is a block diagram of a simplified and representative computer in accordance with the current disclosure.

FIG. 2 illustrates a computing device in the form of a computer 110 incorporating a device supporting direct memory access for compliance checking. Components of the computer 110 may include, but are not limited to a processing unit 120, a system memory 130, and a system bus 121 that couples various system components, including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Computer storage media typically embodies computer readable instructions, data structures, program modules or other data.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 110, or other appropriate mechanism. In a networked environment, program modules depicted relative to the computer 110, or portions thereof may be stored in the remote memory storage device. By way of example, and not limitation, FIG. 2 illustrates remote application programs 185 as residing on memory device 181. In a pay-per-use or subscription application, remote application programs 185 may include initialization and provisioning services.

A security module 125 may be deployed and configured to enforce the terms of an agreement between a user of the computer 110 and a service provider with an interest in the computer 110. The security module 125 may be instantiated in more than one manner. When implemented by one or more discrete components, the isolated computing environment 125 may be disposed on the motherboard (not depicted) or in a multi-chip module (MCM) that is, itself, disposed on the motherboard. The security module is discussed in more detail below with respect to FIGS. 3-4.

Figure 3:
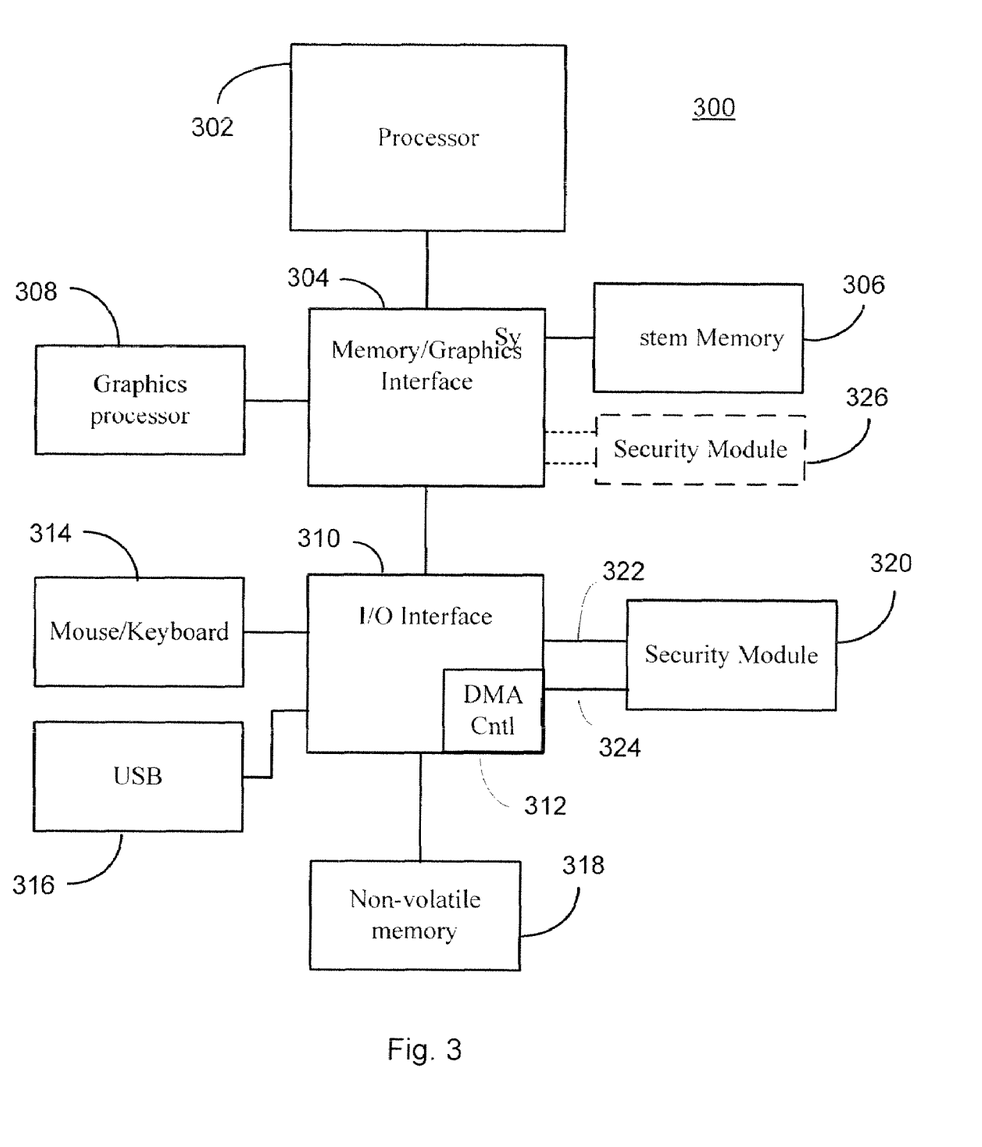
FIG. 3 is a simplified and exemplary block diagram illustrating a functional view of a representative computer in accordance with the current disclosure.

FIG. 3 is an architectural diagram of a computer 300, the same as or similar to the computer 110 of FIG. 2. The architecture of the computer 300 may be typical of general-purpose computers widely sold and in current use. A processor 302 may be coupled to a graphics and memory interface 304. The graphics and memory interface 304 may be a "Northbridge" controller or its functional replacement in newer architectures, such as a "Graphics and AGP Memory Controller Hub" (GMCH). The graphics and memory interface 304 may be coupled to the processor 302 via a high speed data bus, such as the "Front Side Bus" (FSB), known in computer architectures. The processor 302 may also be connected, either directly or through the graphics and memory interface 304, to an input/output interface 310 (I/O interface). The I/O interface 310 may be coupled to a variety of devices represented by, but not limited to, the components discussed below. The I/O interface 310 may be a "Southbridge" chip or a functionally similar circuit, such as an "I/O Controller Hub" (ICH). Several vendors produce current-art Northbridge and Southbridge circuits and their functional equivalents, including Intel Corporation. The I/O interface 310 may include a direct memory access (DMA) controller 312. The DMA controller 312, in conjunction with the I/O controller may allow memory to be accessed with the intervention or involvement of the processor 312.

A variety of functional circuits that incorporate functions related to those described in FIG. 2 may be coupled to either the graphics and memory interface 304 or the I/O Interface 310. The graphics and memory interface 304 may be coupled to system memory 306 and a graphics processor 308, which may itself be connected to a display (not depicted). A mouse/keyboard 314 may be coupled to the I/O interface 310. A universal serial bus (USB) 316 may be used to interface external peripherals including flash memory, cameras, network adapters, etc. (not depicted). Nonvolatile memory 318, such as a hard disk drive or any of the other non-volatile memories listed above, may also be coupled to the I/O interface 310.

A security module (SM) 320 is shown coupled to the I/O controller 310 via a first interface 322. The SM 320 may also have a direct connection to the DMA controller 312. Alternate embodiments may have an SM 326 coupled directly to the graphics and memory interface 304 instead of SM 320. In still other embodiments, the SM 320 may be coupled directly to the processor 302, but access to the memory 306 or DMA controller without processor intervention, while not essential, may increase the security of the application.

In another embodiment, the SM 320 may be physically incorporated inside another architectural component (not depicted), such as the I/O controller 310. The features and functions of the SM 320, as described below, remain the same, but security may be enhanced because the connections 322 324 are readily subject to physical attack.

As opposed to the prior art implementation of FIG. 1, the embodiment of FIG. 3 does not have a separate BIOS storage area. Rather, the BIOS, or several versions of BIOS, may be stored in the SM 320, as will be discussed in more detail with respect to FIG. 4. With respect to enforcement of a policy related to contractual terms of use, the SM 320 may also have an ability to force a system reset at any time. This simple and effective measure helps ensure that pay per use or subscription terms are met, as well as providing a clean environment when starting with either a normal or a restricted operation BIOS, as is discussed below.

Figure 4:
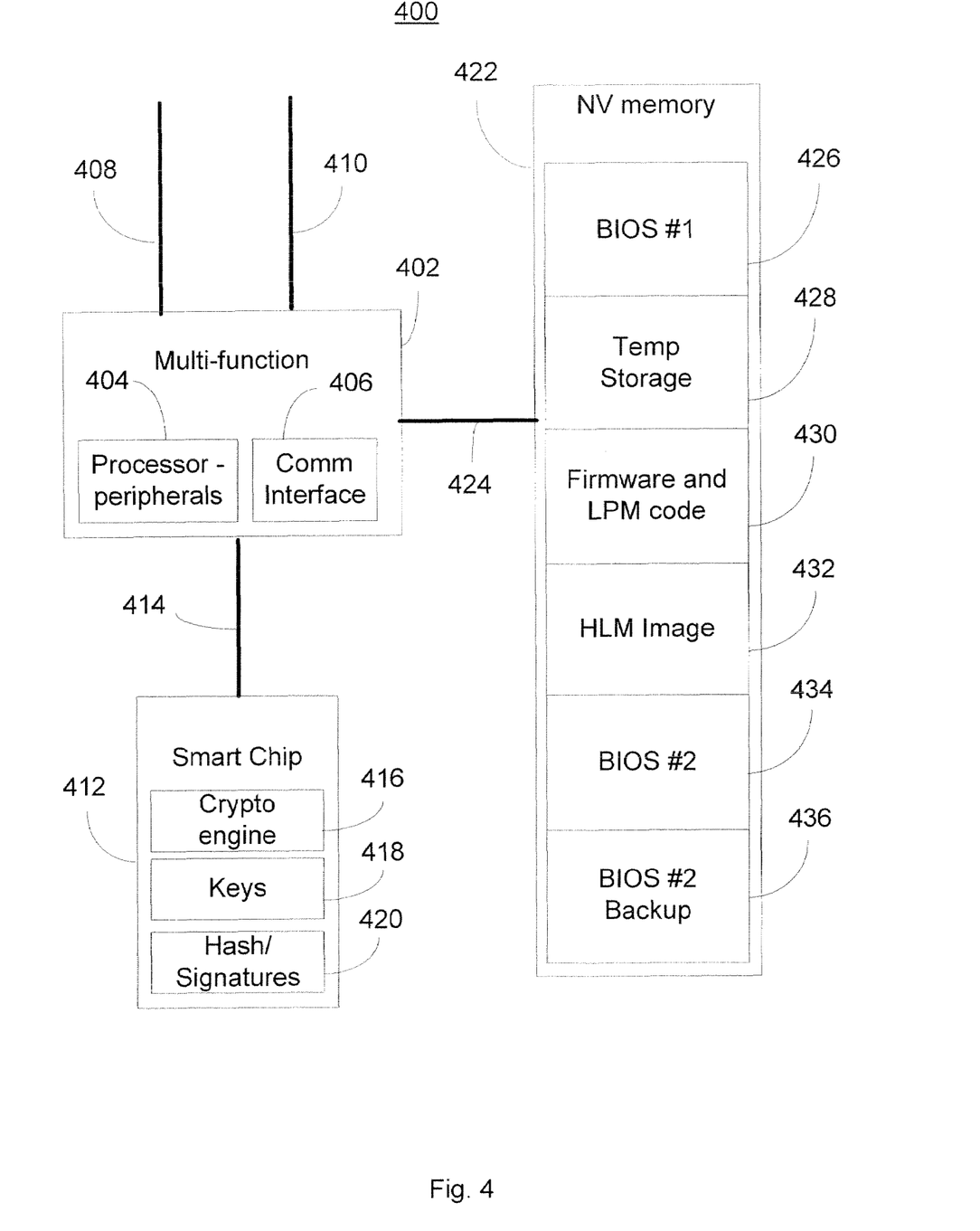
FIG. 4 is a simplified and exemplary block diagram of a security module.

FIG. 4 is a block diagram view of a security module (SM) 400, the same as, or similar to, SM 320 of FIG. 3. A multifunction circuit 402 may incorporate several functions, including a processor and peripheral interface 404 and one or more communication interfaces 406. Two such communication interfaces may be interfaces 408 and 410, for general interface and DMA controller interface, respectively. In one embodiment, the general interface 408 may be a serial peripheral interface (SPI) bus. The multifunction circuit 402 may be a special function chip incorporating a core processor and needed controller functions. A smart chip 412 may be part of the SM 400 and may be connected to the multi-function chip 402 via an interface 414, such as an ISO 7816 interface, known in the art. The smart chip 412 may include a cryptographic engine 416 for performing cryptographic functions as well as secure storage for cryptographic keys 418 and intermediate results, such as hash values and digital signatures 420.

A non-volatile memory 422 may be connected via an interface 424, for example, by another serial peripheral interface (SPI) bus. The non-volatile memory 422 may include storage for system-critical items such as a BIOS 426 for a computer or other electronic device in which the SM 400 is operating. The non-volatile memory 422 may also include memory dedicated to the operation of the SM 400 itself, such as storage 428, for example, for storing metering transaction data, as well as metering code 430. An application 432 for use in providing functionality during limited operation modes of operation, such as a "hardware limited mode," (HLM) may also be stored in the non-volatile memory 422. To support a limited operation mode, a second BIOS 434, and optionally, an alternate copy of the second BIOS 436, may also be stored in the non-volatile memory 422. The second BIOS 434 may be used for booting the computer or other electronic device incorporating the SM 400.

Figure 5:
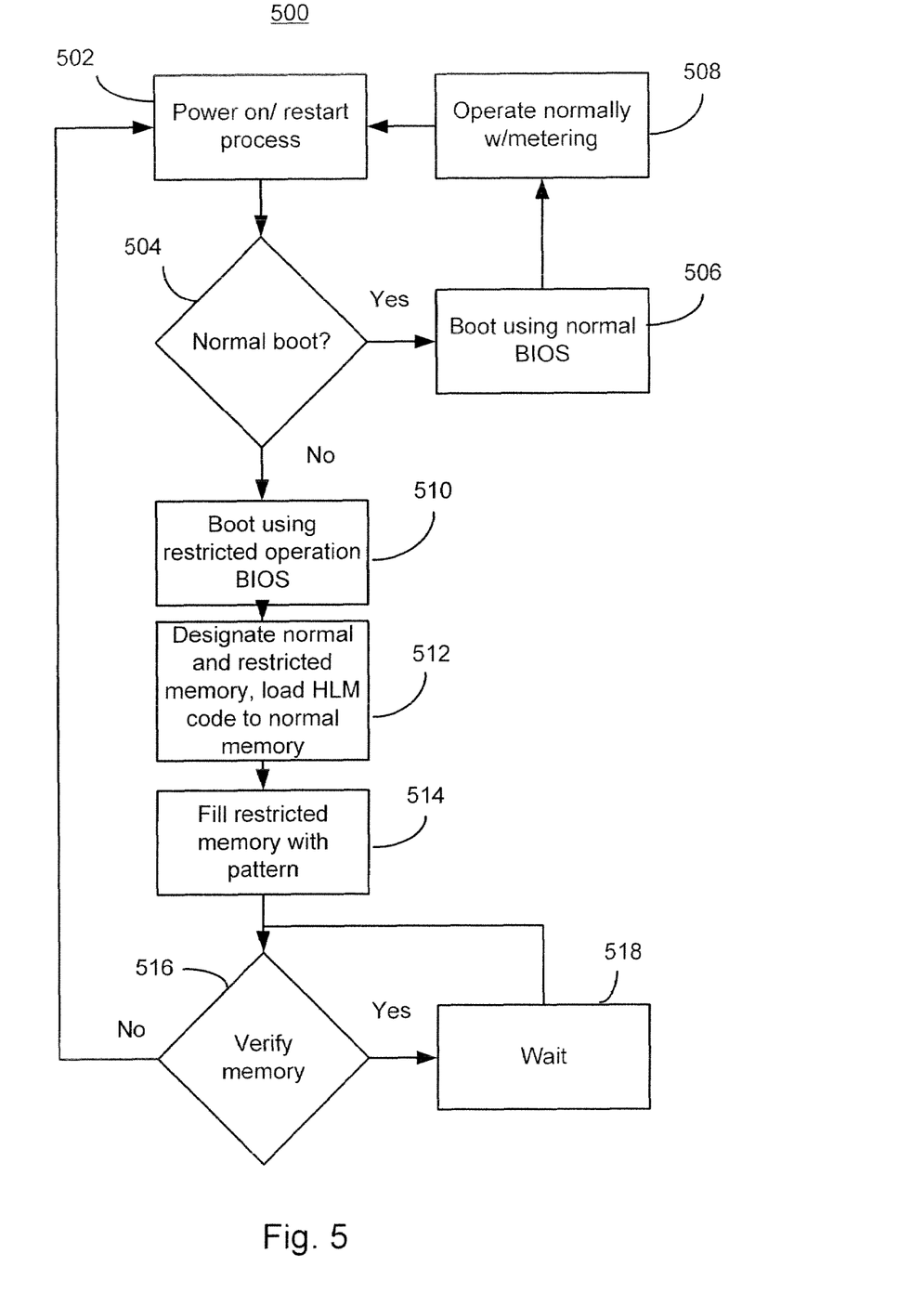
FIG. 5 is a flow chart depicting a method of operating a computer in a full or a reduced function mode.

FIG. 5 is an exemplary method 500 of using a security module (SM), such as SM 320 for operation of a metered computer, such as computer 300. The computer 300 may perform a power-on or restart process at block 502. Such a process may involve following a normal boot sequence known in the art, with the exception that a request for BIOS code from the I/O controller 310 will not result in reading BIOS boot code directly from memory, such as memory 133 of FIG. 2, but may result in a request from the I/O interface 310 of FIG. 3 to the SM 320 for BIOS boot code. At block 504, the SM 320 may determine, by examining data stored in the non-volatile memory 422 of FIG. 4 whether the computer 300 is to use a normal BIOS 426 or a limited operation BIOS 434. For example, data stored in the temporary storage 428 may indicate whether the computer 300 has pre-paid minutes or available subscription usage. When operation in a normal mode is indicated the 'yes' branch from block 504 may be taken to block 506, and the SM 320 may supply the normal BIOS 426 for completing the boot process. Operation may continue at block 508 where metering or monitoring of subscription status may be performed during the operation. Upon either a normal shutdown or restart, or if metering/subscription status changes occur that dictate a restart, operation may continue at block 502.

Figure 6:
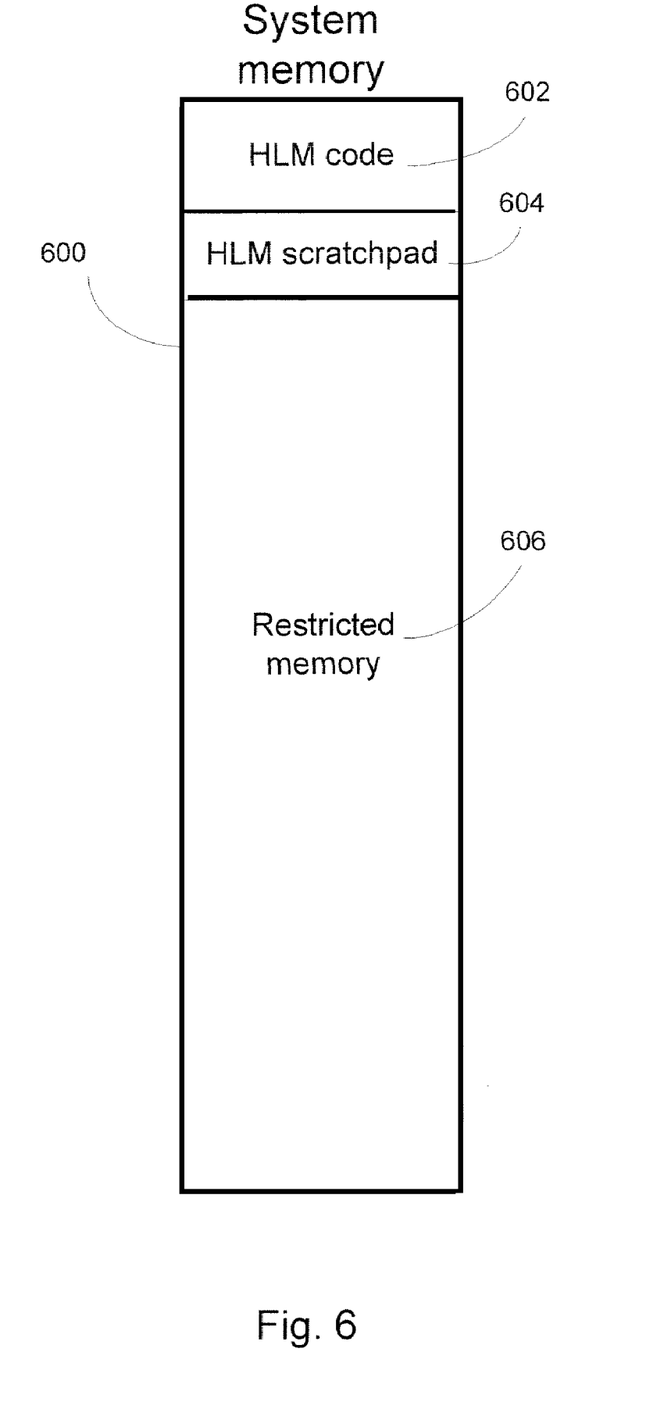
FIG. 6 is a simplified block diagram illustrating allocation of system memory during restricted operation.

When, at block 504, a normal boot is not indicated, the 'no' branch from block 504 may be followed to block 510. At block 510, the SM 320 may supply the alternate restricted operation BIOS 434. Conditions that may indicate a restricted operation boot may be a zero balance on usage time or an expired subscription. Other conditions may also indicate an alternative boot, such as initial activation or evidence of tampering. At block 512, as part of the boot process, the restricted operation BIOS 434 may designate a normal and a restricted portion of memory. Referring briefly to FIG. 6, an embodiment showing the allocation of system memory 600 during restricted operation is illustrated. The normal portion of memory 602 may be allocated to support the hardware limited mode (HLM) application image 432 and necessary operating memory 604 for the HLM application. The HLM application may manage a user interface, limited network connectivity to a provisioning server, such as remote computer 180 of FIG. 2, and communication with the security module 320 used to restore prepaid usage or subscription status and, eventually, to allow normal operation.

The restricted memory 606 may be designated as everything beyond the designated normal portion 602 604. In many embodiments, system memory may range from 512 Mbytes to 2 Gbytes or more. If the HLM application and its required memory 602 604 require 100 Kbytes, the vast majority of system memory 600 may be designated as restricted memory 606. During a boot cycle, any BIOS will normally determine the available system memory and report it to the processor 302. To designate memory as normal or restricted, the restricted operation BIOS 434 may simply report only the limited amount needed for the HLM application 602 604. If the processor 302 does not know about the remaining system memory, it will not be able to access it, unless tampering takes place. Virtually all useful applications, including an operating system, application programs, games, or media players require substantial amounts of system memory, usually tens of megabytes or more. Therefore, removing the processor's ability to access almost all memory in the system effectively removes any beneficial use of the computer. Depending on the embodiment, even some fast peripheral memory, such as disk drive cache memory or unneeded display memory, may be designated as restricted. Returning to FIG. 5, at block 514, to help ensure that unauthorized applications do not use the restricted memory, an application in the security module 320, such as code associated with the lower provisioning module 430, may fill the restricted memory with a known pattern. As discussed above, the security module 320 is rarely likely to have enough memory to mirror every bit of the system memory 306 designated as restricted. Therefore, the pattern may be generated in such a fashion that it can be easily reconstructed and compared to the contents of the restricted memory 606.

After the restricted portion of memory has been filled with the pattern it may be periodically, for example randomly, sampled to verify, either in part or in its entirety, that the pattern has remained undisturbed. It may be important for the security module 320 to have unrestricted access to the system memory for both pattern filling and pattern verification because dependence on the processor 302 may create a security risk posed by a rogue program. Although in an embodiment where the security module is actually embodied on the processor 302, this threat is greatly reduced because the processor is directly observable by the security module 320. In embodiments where the security module 320 is either stand-alone or embodied within another non-processor chip, such as the I/O interface 310, security may be improved when security module can give itself direct memory access.

At block 516, a memory verification may be performed. The verification process may vary depending upon the nature of the pattern placed into restricted memory 606 and how it was generated. For example, if the memory pattern is generated from a seed value that is successively processed through a block cipher, such as AES, the checking process may require and that the restricted memory 606 be checked contiguously in the order it was written. However, if memory locations are filled using a cryptographic algorithm on the memory address, each address may be individually queried, allowing spot checking to verify that the restricted memory 606 has not been tampered or otherwise altered. When, at block 516, the verification is successful the 'yes' branch from block 516 may be taken to block 518 before repeating the verification process. The amount of wait time imposed at block 518 may be function of the time required to perform the test and whether a full verification or random sampling is performed.

When, at block 516, the memory verification fails, the 'no' branch from block 516 may be taken to block 502 by means of the security module 320 forcibly causing a system reset. While it may be desirable to allow the user enough time to contact the provisioning service and restore service, failure of a memory verification may be an indication that the user is attempting to subvert the controls required by contractual terms of use, and therefore may warrant an immediate reset.

The ability of a security module to supply an appropriate BIOS based on previous conditions and to then fill and verify contents of a restricted memory partition that may include the bulk of system memory creates a simple and relatively unobtrusive method for placing a computer or other electronic device into a restricted operating mode. Because the security module itself supplies the BIOS at boot time, the opportunities for hackers to intervene are reduced.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A method of enforcing compliance to a restricted operating regime of an electronic device, the method comprising:
    identifying a condition requiring operation of the electronic device in the restricted operating regime;
    booting the electronic device into the restricted operating regime using an alternate basic input output system (BIOS) that is different from a first BIOS that is used for normal operation and which alternate BIOS, when executed, causes the electronic device to operate in the restricted operating regime;
    designating a first memory range for general use and second memory range restricted from use and inaccessible to the electronic device's main processor, wherein the second memory range is fully available to the main processor when operating from the first BIOS in normal operation;
    writing a pattern to the second memory range using a direct memory access only when operating from the alternate BIOS in the restricted operating regime;
    reading a content of the second memory;
    determining when the content and the pattern match; and
    resetting the electronic device when the content and pattern do not match only when operating from the alternate BIOS in the restricted operating regime.

2. The method of claim 1, wherein reading the content of the second memory range comprises reading the content of the second memory range at a random interval.

3. The method of claim 1, further comprising developing the pattern for writing to the second memory range.

4. The method of claim 3, wherein developing the pattern comprises generating a random pattern and creating a cryptographic hash of the pattern, and wherein determining when the content and the pattern match comprises reading the content, creating a second hash of the content and comparing the second hash and the cryptographic hash.

5. The method of claim 1, further comprising providing the electronic device with a non-volatile memory having a copy of a first BIOS program for use when operating in an unrestricted operating regime and a copy of a second BIOS program for use when operating in the restricted operating regime.

6. The method of claim 5, further comprising executing the second BIOS program BIOS when the identifying a condition requires the restricted operating regime.

7. The method of claim 1, further comprising executing a restricted mode application program when the identifying a condition requires the restricted operating regime.

8. The method of claim 7, wherein designating a first memory range comprises designating the first memory to be a size corresponding to a requirement of the restricted mode application program.

9. The method of claim 1, wherein writing a pattern to the second memory comprises writing a pattern to the second memory using a direct memory access that bypasses a main processor of the electronic device.

10. An apparatus for determining and enforcing a limited function operating mode in an electronic device comprising:
    a processor having a first connection for communication external to the apparatus, a second connection for coupling to a memory controller of the electronic device, and a third connection for communication internal to the apparatus;
    a cryptographic unit including a secure storage area and a cryptographic algorithm engine, wherein the cryptographic unit further includes cryptographic keys for use in generating a memory pattern that is written to a portion of system memory that is restricted from access by the processor only when operating in a limited function mode as a result of booting from a second basic input output system (BIOS); and
    a non-volatile memory including storage for a first BIOS supporting full function operation for the electronic device, wherein the portion of memory is fully accessible to the processor during full function operation as a result of hooting from the first BIOS, the second BIOS different from the first BIOS the second BIOS supporting limited function operation for the electronic device, and a criteria for selecting either the first or second BIOS.

11. The apparatus of claim 10, wherein the first connection is a single pin interface (SPI) and the second connection is directly coupled to a direct memory access (DMA) controller.

12. The apparatus of claim 10, wherein the third connection includes a smart card interface for communication with the cryptographic unit and a second single pin interface for communication with the non-volatile memory.

13. The apparatus of claim 10, wherein the non-volatile memory further includes storage for a provisioning module adapted to meter usage of the electronic device according to a policy.

14. The apparatus of claim 10, wherein the non-volatile memory further includes an application program for use with the limited function BIOS.

15. A computer-readable storage medium having computer-executable instructions for performing a method of metering use of a computer, the method comprising:
    booting from a first BIOS when a condition indicates normal operation;
    determining if prepaid usage minutes have expired during metering usage in normal operation;
    booting from a second BIOS when the condition is expiration of prepaid usage minutes and restricted mode operation is indicated;
    partitioning a system memory into a first partition designated for normal use and a second partition designated for restricted use when booting from the second BIOS having a boot routine different from the first BIOS, wherein the second partition is not accessible by the main processor only when the computer is booted from the second BIOS;
    writing a pattern generated by a cryptographic algorithm to the second partition; and
    determining that the pattern is present in the second partition.

16. The method of claim 15, further comprising resetting the computer when the pattern is not present in the second partition.

17. The method of claim 15, wherein writing the pattern to the second partition comprises generating the pattern using a cryptographic algorithm.

18. The method of claim 15, wherein writing the pattern to the second partition comprises writing a random pattern to the second partition and taking a first hash of the random pattern and wherein determining that the pattern is present in the second partition comprises comparing a second hash of the random pattern to the first hash.

19. The method of claim 15, running a limited operation application in the first partition when operating in the restricted mode.

* * * * *

UNITED STATES PATENT AND TRADEMARK OFFICE
CERTIFICATE OF CORRECTION

| | |
|---|---|
| PATENT NO. | : 7,971,056 B2 |
| APPLICATION NO. | : 11/612433 |
| DATED | : June 28, 2011 |
| INVENTOR(S) | : William J. Westerinen et al. |

It is certified that error appears in the above-identified patent and that said Letters Patent is hereby corrected as shown below:

IN THE CLAIMS:

In column 10, line 22, in Claim 10, delete "hooting" and insert -- booting --, therefor.

In column 10, line 23, in Claim 10, after "first BIOS" insert -- , --.

Signed and Sealed this
Sixteenth Day of August, 2011

David J. Kappos
*Director of the United States Patent and Trademark Office*